Dec. 8, 1964  W. D. WALTHER ETAL  3,160,442
RIM AND WHEEL ASSEMBLIES
Original Filed July 19, 1961
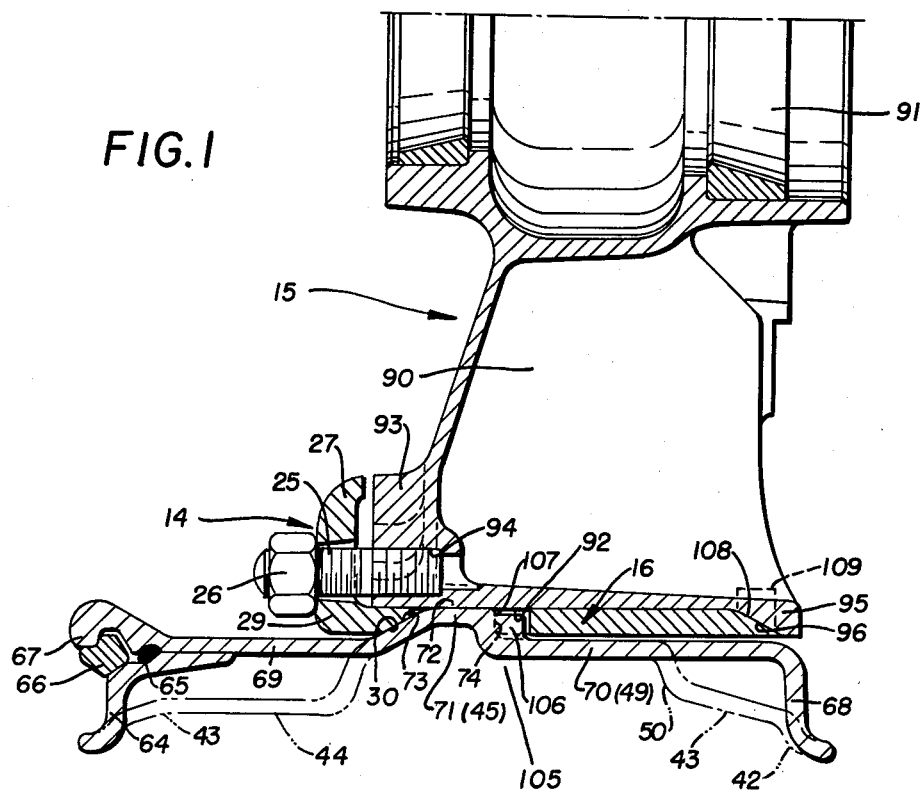
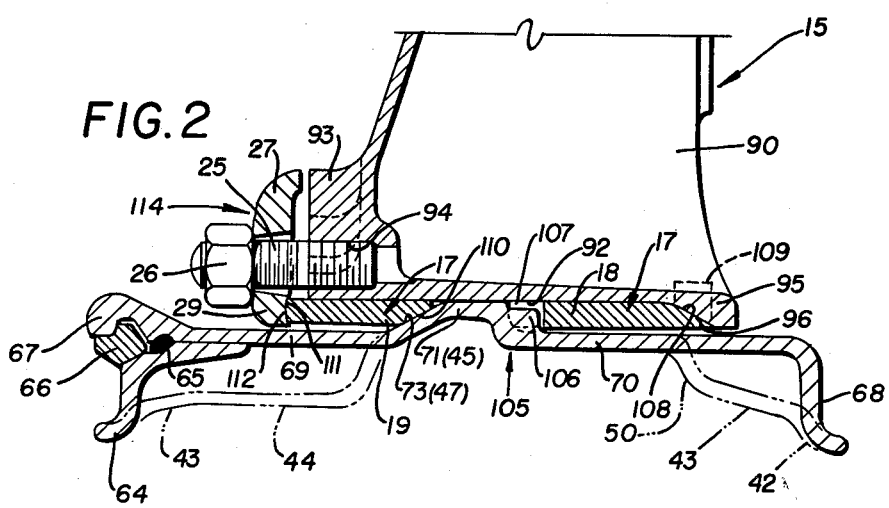
INVENTORS
DANIEL A WALTHER &
WILLIAM D. WALTHER
BY
ATTORNEYS

United States Patent Office 3,160,442
Patented Dec. 8, 1964

3,160,442
RIM AND WHEEL ASSEMBLIES
William D. Walther and Daniel A. Walther, Dayton, Ohio, assignors to The Dayton Steel Foundry Company, Dayton, Ohio, a corporation of Ohio
Original application July 19, 1961, Ser. No. 125,241. Divided and this application Dec. 11, 1963, Ser. No. 331,082
8 Claims. (Cl. 301—12)

This application is a division of United States application Serial No. 125,241, filed July 19, 1961. The present invention relates to rim and wheel assemblies for mounting automotive or vehicle tires. More particularly, the invention relates to novel concepts for rim and wheel assemblies particularly intended for the mounting of relatively "wide bead" or "wide base" truck tires.

The relatively wide bead or wide base truck tire, also currently being referred to by the trade names "Duplex" or "Super Single" tires, is a recent innovation. The advantages claimed for such a tire include greater over-the-road stability for the vehicle, wider spring spacing, higher load carrying capacity, elimination of fire hazards originating from driving on duals when one tire is flat, and reduction in inventory of spare tires. In any event, the relatively wide base truck tire renders conventional rim and wheel assemblies technically obsolescent and requires of new concepts for the mounting.

Therefore, it is an object of the present invention to provide improved rim and wheel assemblies for mounting relatively wide automotive or vehicle tires.

Further, it is an object to provide a rim construction, having bead flanges spaced sufficiently wide apart to accommodate a wide bead truck tire, and which can be mounted on a wheel in a secure and accurate manner by providing for maximum lateral and a maximum radial runout of not more than 0.015 inch, respectively.

Still further, it is an object to provide concepts of improved rims for mounting wide bead tires, which concepts can be applied to the construction of either a so-called "drop center rim" or the earlier form of so-called "flat base rim."

Still further, it is an object to provide a rim construction for mounting wide bead tires in which means are provided to interlock the rim and wheel components of an assembly so that the driving forces will be positively transmitted through the rim and wheel without slippage, distortion of undue axle wear.

These and other objects of the present invention, as well as the advantages thereof, will be apparent in view of the following detailed description of several forms of the invention and the attached drawings.

In the drawing:

FIG. 1 shows a wheel, constructed in accordance with the concepts of the invention and utilizing improved one-piece spacers for mounting either an improved flat base rim (full lines) or an improved drop center rim (chain lines), and FIG. 2 shows the improved wheel of FIG. 1 and the alternative forms of the improved rims, mounted more axially inward of the wheel by the use of improved dual or two-piece spacers.

Each form of improved rim, indicated generally by the numeral 105 has peripheral flanges for seating the tire beads, a relatively wide web or base portion connecting the bead flanges to provide the requisite spacing for the beads of a mounted tire, a relatively narrow radially inwardly directed rib member located medially of the web and having, a preferably flat and horizontal, axially extending load bearing surface with an inner diameter just slightly greater than the load bearing surface of the wheel, and preferably one or more radially inward facing axially extending driving lugs (or notches) on the web adjacent the medial rib.

The form of improved wheel, indicated generally by the numeral 15, has a load bearing or felly surface of substantially conventional width on the outer end of each radially extending spoke member. The inclined surface on a flange portion at the axially inner end of the felly surface is not intended for mounting the flange of the inner rim as in a conventional dual rim and wheel assembly, but is utilized to seat the axially inner end of an improved spacer band. The axially inner portion of each spoke member preferably also has a series of driving notches (or lugs) extending axially inwardly through the flange portion from the inclined surface.

The single spacer band, indicated generally by the numeral 18 and shown in FIG. 1, has an axially inner portion which seats against the wheel flange portion. The axially inner portion of a spacer 16 preferably also has a series of driving lugs (or notches) to selectively interfit and positively interlock with driving notches (or lugs) on the spoke ends of a wheel 15. The axially outer portion of a spacer 16 preferably also has a series of driving notches (or lugs) to selectively interfit and positively interlock with at least one of the rim driving lugs (or notches).

The dual or split spacer band, indicated generally by the numeral 17 and shown in FIG. 2, has an inner band 18 seated or interfitting between the axially inner side of the medial rib of a rim 105 and the flange portion of a wheel 15, and preferably also having interfitting and interlocking lugs and notches in the manner of spacer 16. The outer band 19 seats between the axially outer side of the rim medial rib and the clamping surface of a lug 114 or other suitable clamp means or device.

Referring to FIG. 1, each clamp lug 114 has a radially oriented upright leg 27 with a slot for a stud or supporting bolt 25. The horizontal leg or lateral portion 29 of a lug 114 extends axially inward along the face of a wheel felly surface and terminates in an axially inward radially inclined conical surface or face 30 for wedging engagement with the axially outer side of the medial rib of a rim 105. The clamp face 30 is beveled at a standard clamping angle, (e.g.) approximately 28°, as shown.

The rims shown in chain lines as mounted on a wheel 15 are generally of the so-called drop center type, and could be used, for example, for mounting wide bead tires having a radial diameter of 20". Such a rim has low side flanges 42 for confining the outer edge of each tire bead, integral peripheral bead flanges 43 having a standard 15–20° taper for the actual seating of each tire bead and safety ledge 44. Elements 42, 43 and 44 are found in conventional drop center rim constructions.

Axially inward of the safety ledge 44, the web or base portion of a drop center rim 105 is formed to provide a medial rib or load bearing member 45. The radially inward face of a medial rib 45 is flat and horizontal to provide an annularly continuous axially extending surface 46 for seating against the machined felly surfaces 92 of a wheel 15.

The axially outer side of a medial rib 45 is radially inclined at a suitable angle to provide an annularly continuous surface 47 for wedging engagement by each clamp lug.

The axially inner side of a medial rib 45 is radially or vertically oriented at a suitable angle to provide an annularly continuous surface for mating engagement against the axially outer portion of a spacer 16 or 18.

Axially inward of the annularly continuous rib surface, the web portion of a rim has a horizontal portion 49 extending laterally to intersect a short vertical portion 50 extending radially inward from the axially inner bead flange 43. The approximately right angled portions 49 and 50 are preferably embodied in the rim to provide for greater strength and rigidity of structure.

The rims shown in full lines as mounted on a wheel 15 are generally of the so-called flat base type, and could be used, for example, for mounting wide bead tires having a radial diameter of 20". The axially outer side of a flat base rim has a removable bead flange 64, air seal 65, if the rim is to mount a "tubeless tire," and lock ring 66 interfitting with a lock flange 67. The axially inner side of the rim has a fixed bead flange 68. Elements 64, 65, if used, 66, 67 and 68 are found in conventional flat base rim constructions.

Between the flanges 67 and 68, the web or base portion of the rim has two laterally extending portions 69 and 70 connected by a medial rib or load bearing member 71. In the same manner as described above with respect to the medial rib 45 of a drop center rim, the medial rib 71 of the flat base rim has a flat and horizontal surface 72 seating against the felly surfaces 92 of a wheel 15, a radially inclined surface 73 for wedging engagement by each clamp lug, and a vertically oriented surface 74 for mating engagement against the axially outer portion of a spacer 16 or 18.

A wheel 15 may have any desired number of spoke members 90 extending radially from a hub area 91 and terminating at their outward ends in an accurately machined load bearing or felly surface 92. The radially outer terminal portion of each spoke member is provided with a projecting boss 93 having a threaded bore 94 for attachment of a clamp lug, as by a stud bolt 25 and nut 26.

The axially extending felly surface 92 is of substantially conventional width and terminates at a flange portion 95 having a beveled bearing surface 96 inclined radially outward at a standard angle (e.g.), approximately 28° as shown. Elements 90, 91, 92, 93, 94, 95 and 96 are found in conventional spoke wheel construction, see by way of example, George Walther, Sr., U.S. Patent No. 2,767,026.

Referring to FIG. 1, the rim 105 is aligned and positioned on the wheel 15 by a preferably annularly continuous spacer or band 16. The radially inner face of a band 16 is preferably accurately machined to provide a close tolerance slip fit over the felly surfaces 92 of a wheel 15. Between the radially outer face of a band 16 and the axially inner web portion (70 or 49) of a rim 105, the clearance is sufficient for easy mounting of the rim on the wheel.

The axially outer portion or face of band 16 is preferably provided with a series of driving notches 107 located and shaped so as to selectively and positively interlock with a rim driving lug 106 preferably located immediately next to the axially inner surfaces of a medial rib (71 or 45). The axially inner portion or face of band 16 is radially inclined at a suitable angle to provide a surface 108 for wedging engagement against the surface 96 of each spoke flange 95. If desired, the axially inner portion of band 16 may be provided with axially extending driving lugs 109 projecting radially inward of the spoke flanges 95 or felly surfaces 92 and received within suitable notches formed in the spoke ends.

Referring to FIG. 2, the dual or split spacer 17 may be utilized when it is desired to mount the rim 105 closer to the axial center of the wheel 15, for purposes of weight load distribution, spring spacing, etc. The inner band 18 would be of narrower width than spacer 16 but otherwise similar, having axially outer driving notches 107, a surface 108, and axially inner driving lugs 109, if desired.

The axially inner portion or face of the outer band 19 of a spacer 17 is radially inclined at a suitable angle to provide a surface 110 for wedging engagement against the axially outer side (surfaces 73 or 47) of the medial rib (71 or 45) of rim 105. The axially outer portion or face of the band 19 is oriented or inclined to provide a surface 111 for mating engagement by the clamping surface 112 of a clamp means 114. As shown, the clamp lug 114 shown in FIG. 2 differs from the clamp lug shown in FIG. 1, in that there is no horizontal leg or lateral portion and the clamping surface 112 is provided on the end of the upright clamp leg 27 extending radially outwardly of felly surfaces 92. The axially outer face of the band 19 extends laterally outward beyond felly surface 92 of the wheel 15 to provide a surface 111 suitably oriented, preferably substantially perpendicularly to the rotational axis of the wheel 15, for mating engagement at a point axially outward of the wheel felly surface 92 with the clamp lug surface 112. A clamp means of the general form of clamp lug 114 is preferred to accurately and securely align the outer band 19, of a dual spacer 17, with the rim 105.

*Conclusion*

The above disclosure of several forms of rim and wheel assemblies particularly intended for the mounting of relatively wide bead or wide base truck tires is illustrative of the novel concepts of the invention. It will also be apparent from the disclosure that the various rim-wheel-spacer elements embodying the concepts of this invention could be changed or modified without departure from the true scope and spirit of the invention. Therefore, the true scope of the invention should be adjudged solely by the appended claims.

What is claimed is:

1. A rim and wheel assembly for wide bead tires, comprising, a wheel having a relatively wide felly surface on the outward ends of radially extending spoke members and a radially outwardly directed flange portion at the axially inner end of each felly surface, an annular spacer band having an axially inner face for seating against said wheel flange portions, and a rim having peripheral flanges for seating the tire beads, a relatively wide base portion connecting the bead flanges, and a relatively narrow radially inwardly directed rib member located medially of said base portion, the radially inward face of said medial rib having an axially extending surface for seating against said felly surfaces, the axially inner side of said medial rib being oriented to provide a surface for seating against the axially outer face of said spacer band.

2. A rim and wheel assembly according to claim 1 in which the axially outer face of each wheel flange portion is beveled at an angle of approximately 28° and said annular spacer band is seated between the axially inner side of said medial rib and said beveled flange face.

3. A rim and wheel assembly for wide bead tires, comprising, a wheel having a relatively wide felly surface on the outward ends of radially extending spoke members and a radially outwardly directed flange portion at the axially inner end of each felly surface, a series of lugs having a clamping surface extending radially outwardly of said felly surfaces, a first annular spacer band having an axially inner face for seating against said wheel flange portions, a second annular spacer band having an axially outer face for seating against said lug clamping surfaces, and a rim having peripheral flanges for seating the tire beads, a relatively wide base portion connecting the bead flanges, and a relatively narrow radially inwardly directed rib member located medially of said base portion, the radially inward face of said medial rib having an axially extending surface for seating against said felly surfaces, the axially inner side of said medial rib being oriented to provide a surface for seating against the axially outer face of said first spacer band, the axially outer side of said medial rib being oriented to provide a surface for seating against the axially inner face of said second spacer band.

4. A rim and wheel assembly according to claim 3 in which the axially outer face of each wheel flange portion is beveled at an angle of approximately 28° and said first annular spacer band is seated between the axially inner side of said medial rib and said beveled flange face.

5. A rim and wheel assembly for wide bead tires, comprising, a wheel having a relatively wide felly surface on the outward ends of radially extending spoke members, a radially outwardly directed flange portion at the axially inner end of each felly surface, and a series of notches extending axially inwardly through each flange portion, an annular spacer band having an axially inner portion with a series of axially extending lugs and an axially outer portion with a series of axially extending notches, and a rim having peripheral flanges for seating the tire beads, a relatively wide base portion connecting the bead flanges, a relatively narrow radially inwardly directed rib member located medially of said base portion, the radially inward face of said medial rib having an axially extending surface for seating against said felly surfaces, the axially inner side of said medial rib being oriented to provide a surface for seating against the axially outer face of said spacer band, and at least one axially extending lug on said base portion adjacent the axially inner side of said medial rib, the series of lugs on said spacer band selectively interfitting with said flange notches, the series of notches on said spacer band selectively interfitting with at least one of said rim base lugs.

6. A rim and wheel assembly according to claim 5 in which the axially outer face of each wheel flange portion is beveled at an angle of approximately 28° and said annular spacer band is seated against the axially inner side of said medial rib with said notches selectively interfitting with at least one of said rim lugs and against said beveled flange face with said lugs selectively interfitting with said flange notches.

7. A rim and wheel assembly for wide bead tires, comprising, a wheel having a relatively wide felly surface on the outward ends of radially extending spoke members, a radially outwardly directed flange portion at the axially inner end of each felly surface, and a series of notches extending axially inwardly through each flange portion, a series of lugs having a clamping surface extending radially outwardly of said felly surfaces, a first annular spacer band having an axially inner portion with a series of axially extending lugs and an axially outer portion with a series of axially extending notches, a second annular spacer band having an axially outer face for seating against said lug clamping surfaces, and a rim having peripheral flanges for seating the tire beads, a relatively wide base portion connecting the bead flanges, a relatively narrow radially inwardly directed rib member located medially of said base portion, the radially inward face of said medial rib having an axially extending surface for seating against said felly surfaces, the axially outer side of said medial rib being oriented to provide a surface for seating against the axially outer face of said first spacer band, the axially outer side of said medial rib being oriented to provide a surface for seating against the axially inner face of said second spacer band, and at least one axially extending lug on said base portion adjacent the axially inner side of said medial rib, the series of lugs on said first spacer band selectively interfitting with said flange notches, the series of notches on said first spacer band selectively interfitting with at least one of said rim base lugs.

8. A rim and wheel assembly according to claim 7 in which the axially outer face of each wheel flange portion is beveled at an angle of approximately 28° and said first annular spacer band is seated against the axially inner side of said medial rib with said notches selectively interfitting with at least one of said rim lugs and against said beveled flange surface with said lugs selectively interfitting with said flange notches.

References Cited in the file of this patent

UNITED STATES PATENTS

| | | |
|---|---|---|
| 1,869,635 | Walther | Aug. 2, 1932 |
| 3,007,741 | Brown | Nov. 7, 1961 |

FOREIGN PATENTS

| | | |
|---|---|---|
| 982,468 | France | Jan. 31, 1951 |